United States Patent
Onaizi

(10) Patent No.: US 12,128,356 B1
(45) Date of Patent: Oct. 29, 2024

(54) PROCESS FOR REMOVING HYDROGEN SULFIDE FROM SOUR GASES WITH ZIF-67 SUPPORTED ON MIXED METAL OXIDES

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/761,552

(22) Filed: Jul. 2, 2024

(51) Int. Cl.
*B01D 53/86* (2006.01)
*B01J 21/04* (2006.01)
(Continued)

(52) U.S. Cl.
CPC .......... *B01D 53/8612* (2013.01); *B01J 21/04* (2013.01); *B01J 23/002* (2013.01); *B01J 23/72* (2013.01);
(Continued)

(58) Field of Classification Search
CPC .......... B01J 35/45; B01J 35/51; B01J 35/615; B01J 35/613; B01J 35/633; B01J 21/04;
(Continued)

(56) References Cited

U.S. PATENT DOCUMENTS

| | | | | |
|---|---|---|---|---|
| 10,767,027 | B1 * | 9/2020 | Sun | .......................... C08J 11/28 |
| 2009/0325794 | A1 * | 12/2009 | Wolk | ..................... B01J 21/066 |
| | | | | 502/342 |

(Continued)

FOREIGN PATENT DOCUMENTS

| CN | 117123234 A | 11/2023 | |
|---|---|---|---|
| GB | 2562309 A | * 11/2018 | ............. B01D 15/02 |

OTHER PUBLICATIONS

Xin Wang et al., "Contributions of Mn-doping in CuO/Al2O3 sorbent for enhancement of H2S removal at low and wide temperature range." Fuel, vol. 334, pp. 1-10. (Year: 2023).*

Mustapha Iddrisu et al., "H2S scavenging and rheological properties of water-based drilling fluids comprising ZIF-67." Geoenergy Science and Engineering 228, pp. 1-13. (Year: 2023).*

Percival Soni Castro et al., "Review of the adsorbents/catalysts for the removal of sulfur compounds from natural gas." Gas Science and Engineering 115, pp. 1-27. (Year: 2023).*

(Continued)

*Primary Examiner* — Patricia L. Hailey
(74) *Attorney, Agent, or Firm* — Oblon, McClelland, Maier & Neustadt, L.L.P.

(57) ABSTRACT

A method for removing hydrogen sulfide ($H_2S$) from a $H_2S$-containing gas composition, including charging an aqueous media to a reactor under continuous agitation, dispersing particles of a composite in the aqueous media to form a composite mixture, continuously agitating the composite mixture, introducing the $H_2S$-containing gas composition to the reactor containing the composite mixture under continuous agitation and passing the $H_2S$-containing gas composition through the composite mixture, and adsorbing and removing $H_2S$ from the gas composition by the composite mixture to form a purified gas composition. The composite contains a CuMnAl mixed metal oxide (MMO) and zeolitic imidazolate framework-67 (ZIF-67) nanoparticles. The ZIF-67 nanoparticles are dispersed between layers of the CuMnAl MMO.

19 Claims, 6 Drawing Sheets

(51) Int. Cl.
*B01J 23/00* (2006.01)
*B01J 23/72* (2006.01)
*B01J 23/889* (2006.01)
*B01J 29/06* (2006.01)
*B01J 35/45* (2024.01)
*B01J 35/51* (2024.01)
*B01J 35/61* (2024.01)
*B01J 35/63* (2024.01)
*B01J 37/03* (2006.01)
*B01J 37/04* (2006.01)
*B01J 37/12* (2006.01)

(52) U.S. Cl.
CPC ............. *B01J 23/889* (2013.01); *B01J 29/06* (2013.01); *B01J 35/45* (2024.01); *B01J 35/51* (2024.01); *B01J 35/613* (2024.01); *B01J 35/615* (2024.01); *B01J 35/633* (2024.01); *B01J 37/035* (2013.01); *B01J 37/04* (2013.01); *B01J 37/12* (2013.01); *B01D 2257/304* (2013.01)

(58) Field of Classification Search
CPC ........ B01J 23/002; B01J 23/72; B01J 23/889; B01J 29/06; B01J 37/035; B01J 37/04; B01J 37/12; B01J 20/226; B01D 53/8612; B01D 2257/304
USPC ............ 502/324, 345, 346, 517; 423/244.01, 423/244.02, 244.03, 563, 564
See application file for complete search history.

(56) References Cited

U.S. PATENT DOCUMENTS

| | | |
|---|---|---|
| 2010/0135884 A1* | 6/2010 | Serban ............... B01D 53/8612 |
| | | 423/244.05 |
| 2023/0050105 A1 | 2/2023 | Ben-Zvi et al. |
| 2024/0018406 A1 | 1/2024 | Onaizi |
| 2024/0082809 A1 | 3/2024 | Onaizi |
| 2024/0093107 A1 | 3/2024 | Onaizi |
| 2024/0124305 A1* | 4/2024 | Onaizi .................. C01B 17/168 |

OTHER PUBLICATIONS

João Paulo Lobo dos Santos et al., "Comparison of different processes for preventing deposition of elemental sulfur in natural gas pipelines: a review." Journal of Natural Gas Science and Engineering 32, pp. 364-372. (Year: 2016).*

Mansi S. Shah et al., "Hydrogen Sulfide Capture: From Absorption in Polar Liquids to Oxide, Zeolite, and Metal-Organic Framework Adsorbents and Membranes." Chemical Reviews 117, pp. 9755-9803. (Year: 2017).*

Jamiu O. Eniola et al., "Hydrothermal synthesis of structurally variable binary CuAl, MnAl, and ternary CuMnAl hydroxides for oxytetracycline antibiotic adsorption." Journal of Environmental Chemical Engineering 8, pp. 1-9. (Year: 2020).*

Xin Wang et al., "Contributions of Mn-doping in CuO/Al2O3 sorbent for enhancement of H2S removal at low and wide temperature range", Fuel, vol. 334, Part 1, Feb. 15, 2023, 3 pages.

Mustapha Iddrisu et al., "H2S scavenging performance and rheological properties of water-based drilling fluids comprising ZIF-67", Geoenergy Science and Engineering, vol. 228, Sep. 2023, 4 pages.

* cited by examiner

PROCESS FOR REMOVING HYDROGEN SULFIDE FROM SOUR GASES WITH ZIF-67 SUPPORTED ON MIXED METAL OXIDES

STATEMENT OF ACKNOWLEDGEMENT

Support provided by the King Fahd University of Petroleum and Minerals (KFUPM) is gratefully acknowledged.

BACKGROUND

Technical Field

The present disclosure is directed to a process for removing hydrogen sulfide ($H_2S$) from a $H_2S$-containing fluid, and particularly, to the process for removing $H_2S$ from a gaseous composition with a mixed metal oxide and ZIF-67 composite.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Hydrogen sulfide is a colorless, odiferous, and highly toxic gas that can cause possible life-threatening situations at a concentration as low as 350 ppm for a short-term exposure. In addition to its toxicity, health and safety issues, this colorless gas is also highly corrosive and hence it is desirable and often necessary to remove hydrogen sulfide from a hydrogen sulfide containing stream, such as sour natural gas, biogas, and sour gases.

Accordingly, the maximum concentration of $H_2S$ in marketable natural gas is 4 ppmv at standard temperature and pressure, which is considered to be the threshold value above which the natural gas needs to be sweetened in order to reduce the $H_2S$ concentration. Localized corrosion and stress cracking is common in pipes/units handling $H_2S$-containing streams. It has been reported that the presence of $H_2S$ even at low concentrations can cause a substantial adverse impact on carbon steel. Therefore, $H_2S$ must be effectively scavenged from sour gases to not only mitigate its safety and operational issues but also reduce its damage to the pipelines, valves and surfaces of process equipment.

Technologies and approaches to these problems have been developed industrially for sweetening (e.g., removing $H_2S$) hydrocarbons and natural gas. These technologies mainly involve the use of amine-based solutions, carbonaceous materials, or metal salts as adsorbents of $H_2S$, or as oxidizers for converting $H_2S$ to more harmless element sulfur. Practical approaches often involve (i) complicated homogenous systems, (ii) sophisticated chemical agents, e.g., highly functionalized chelating agents, flammable oxidizing agents and costly stabilizers, and (iii) restricted application conditions, e.g., limited pH ranges, particular temperature ranges, and certain pressure requirements. Hence, there is a need for improved desulfurization and/or sweetening techniques, and apparatuses and protocols for such treatment.

In view of the forgoing, one objective of the present disclosure is to provide a process for removing $H_2S$ from a $H_2S$-containing gas composition. A further objective of the present disclosure is to provide a method of making a mixed metal oxide and ZIF-67 composite, and its application in a continuous stirred tank process for the desulfurization of sour gases and liquid hydrocarbon fuels.

SUMMARY

In an exemplary embodiment, a process for removing hydrogen sulfide ($H_2S$) from a $H_2S$-containing gas composition is described. The process for removing $H_2S$ from the $H_2S$-containing gas composition includes charging an aqueous media to a reactor under continuous agitation. The process also includes dispersing particles of a composite in the aqueous media to form a composite mixture. The process further includes continuously agitating the composite mixture. In addition, the process involves introducing the $H_2S$-containing gas composition to the reactor containing the composite mixture under continuous agitation and passing the $H_2S$-containing gas composition through the composite mixture. Furthermore, the process also includes adsorbing the $H_2S$ from the $H_2S$-containing gas composition onto the composite to remove the $H_2S$ from the $H_2S$-containing gas composition and form a purified gas composition. The composite includes a CuMnAl mixed metal oxide (MMO) and zeolitic imidazolate framework-67 (ZIF-67) nanoparticles. The ZIF-67 nanoparticles are dispersed between layers of the CuMnAl MMO. The composite is made by a method including preparing a CuMnAl layered triple hydroxide (LTH), calcining the CuMnAl LTH to form a CuMnAl MMO, and mixing the CuMnAl MMO with precursors of the ZIF-67 to form the composite.

In some embodiments, the CuMnAl MMO has a molar ratio of Cu to Mn to Al of 1-10 to 1-10 to 1-10.

In some embodiments, the CuMnAl MMO has a molar ratio of Cu to Mn to Al of 1 to 2 to 1.

In some embodiments, the composite contains 30-70 wt. % of the CuMnAl MMO and 30-70 wt. % of the ZIF-67 nanoparticles, based on a total weight of the composite.

In some embodiments, the ZIF-67 nanoparticles have an average size of 1-100 nm.

In some embodiments, the ZIF-67 nanoparticles have a spherical shape.

In some embodiments, the ZIF-67 nanoparticles are further dispersed on top of layers of the CuMnAl MMO.

In some embodiments, the composite has a Langmuir specific surface area of 100-150 $m^2/g$.

In some embodiments, the composite has a BET specific surface area of 90-130 $m^2/g$. In some embodiments, the composite has a specific pore volume of 0.05-0.2 $m^3/g$.

In some embodiments, the composite has a pore size of 20-25 nm.

In some embodiments, the composite has a zeta potential of 10-30 mV at a pH of 4 to 9.

In some embodiments, the gas composition further contains at least one of methane, carbon dioxide, and nitrogen, and the composite selectively adsorbs the $H_2S$.

In some embodiments, the $H_2S$ is present in the gas composition at a concentration in a range of 10 to 200 parts per million by volume (ppmv) based on a total volume of the gas composition.

In some embodiments, the $H_2S$-containing gas composition is introduced to the reactor at a rate of 0.4 to 2.0 milliliters per minute (mL/min) per milligram of the composite.

In some embodiments, the composite is present in the liquid at a concentration in a range of from 0.5 to 2 milligrams per milliliter (mg/mL).

In some embodiments, the composite is present in the aqueous media at a concentration of 1 mg/mL, the composite is in contact with the gas composition containing 100 ppmv of H₂S at a rate of 80 mL/min in the stirred tank reactor, the composite has a breakthrough time of from 11-15 hours, and a saturation time of from 35-40 hours.

In some embodiments, the composite has a saturation scavenging capacity 100-130 mg of hydrogen sulfide per gram of composite in the reactor.

In some embodiments, the composite is supported on a support selected from the group consisting of carbon nanotubes, activated carbon, metal organic frameworks (MOFs), and other zeolitic imidazolate frameworks (ZIFs).

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
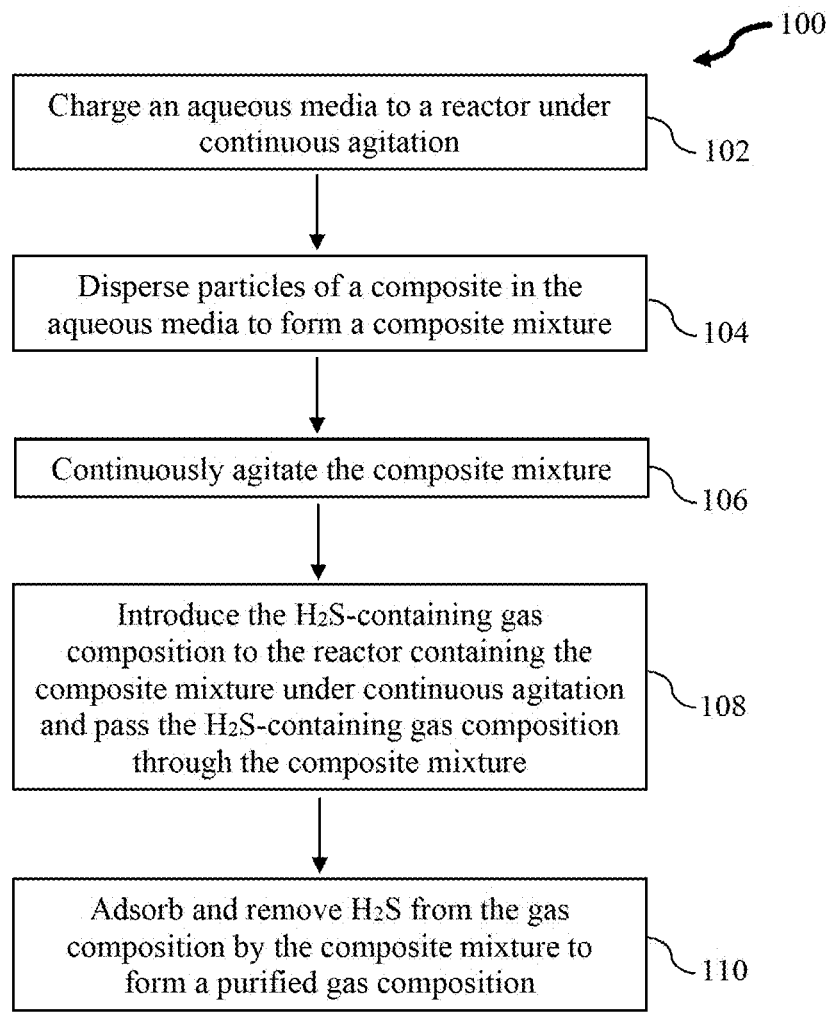
FIG. 1 is a schematic flow diagram of a process for removing hydrogen sulfide (H₂S) from a H₂S-containing gas composition, according to certain embodiments.

In the following description, it is understood that other embodiments may be utilized, and structural and operational changes may be made without departure from the scope of the present embodiments disclosed herein.

Embodiments of the present disclosure will now be described more fully hereinafter with reference to the accompanying drawings, in which some, but not all embodiments of the disclosure are shown. In the drawings, like reference numerals designate identical or corresponding parts throughout the several views.

Furthermore, the terms "approximately," "approximate," "about," and similar terms generally refer to ranges that include the identified value within a margin of 20%, 10%, or preferably 5%, and any values there between.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "fluid" refers to a gas, a liquid, a mixture of gas and liquid, or a gas or liquid comprising dispersed solids, droplets and/or bubbles. The droplets and/or bubbles may be irregular or regular and may be similar or different in size.

As used herein, the term "stirred tank reactor," "continuous stirred tank reactor," "mixed flow reactor," "continuous flow stirred tank reactor," and similar terms generally refer to a model for a chemical reactor in chemical engineering. The stirred tank reactor may have a liquid height and a rotating shaft containing a plurality of agitator blades.

As used herein, the term "quenching" refers to the rapid reduction of the temperature of the reaction mixture, the rapid introduction of a reactant or non-reactant fluid into the reaction mixture, or the reaction through a restricted opening or passage having dimensions below the quench diameter. In accordance with the present invention disclosure, the term "quenching" also refers to the process of terminating a chemical reaction with an associated reduction of temperature.

As used herein, the term "hydrocarbon" refers to hydrocarbon compounds, i.e., aliphatic compounds (e.g., alkanes, alkenes or alkynes), alicyclic compounds (e.g., cycloalkanes, cycloalkylenes), aromatic compounds, aliphatic and alicyclic substituted. It may refer to aromatic compounds, aromatic substituted aliphatic compounds, aromatic substituted alicyclic compounds and similar compounds. The term "hydrocarbon" may also refer to a substituted hydrocarbon compound, e.g., a hydrocarbon compound containing non-hydrocarbon substituents. Examples of non-hydrocarbon substituents may include hydroxyl, acyl, nitro and the like. The term "hydrocarbon" may as well refer to a hetero-substituted hydrocarbon compound, i.e., a hydrocarbon compound which comprises an atom other than carbon in the chain or ring and the other part comprises a carbon atom. Heteroatoms may include, for example, nitrogen, oxygen, sulfur and similar elements.

The present disclosure describes a process for H₂S scavenging from sour gases and liquids in a continuous stirred tank reactor to meet the growing needs of desulfurization on an industrial scale. The process optionally involves making and using a composite to react with the H₂S in a heterogeneous mixture. The effectiveness of the said process and composite was assessed by injecting a sour natural gas into a stirred tank reactor containing the composite dispersed in a liquid. The gas leaving the stirred tank reactor was continuously monitored and the concentration of H₂S in the sweetened gas was continuously measured, enabling the construction of H₂S breakthrough curves and the calculation of the amount of H₂S scavenged.

According to a first aspect, the present disclosure relates to a process for removing hydrogen sulfide (H₂S) from a H₂S-containing gas composition. The process for removing H₂S from a H₂S-containing gas composition involves (i) charging an aqueous media to a reactor optionally under continuous agitation, (ii) dispersing particles of a composite in the aqueous media to form a composite mixture, (iii) continuously agitating the composite mixture, (iv) introducing the H₂S-containing gas composition to the reactor containing the composite mixture under continuous agitation and passing the H₂S-containing gas composition through the composite mixture, and (v) adsorbing the H₂S from the H₂S-containing gas composition onto the composite to remove the H₂S from the H₂S-containing gas composition and form a purified gas composition.

Referring to FIG. 1, a schematic flow diagram of a process for removing H₂S from a H₂S-containing gas composition is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes charging a liquid to a reactor under continuous agitation. In one exemplary embodiment, the liquid includes an aqueous media, an oil, an oil-in-water emulsion, and/or a water-in-oil emulsion. In one embodiment, the liquid is a sour oil. In a preferred embodiment, the liquid is a sour water. In a more preferred embodiment, the liquid is selected from the group consisting of tap water, ground water, distilled water, deionized water, saltwater, hard water, fresh water, and wastewater. For purposes of this description, the term "saltwater" may include saltwater with a chloride ion content of between about 6000 ppm and saturation and is intended to encompass seawater and other types of saltwater including groundwater containing additional impurities typically found therein such as brackish water. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, the liquid may further contain ethylene glycol, methanol, ethanol, propanol, isopropanol, n-butanol, ethyl acetate, pet ether, pentane, hexane(s), decalin, THF, dioxane, toluene, xylene(s), and/or o-dichlorobenzene. In some more other embodiments, the liquid may contain a minority fraction of, or even no, water.

In some preferred embodiments, the liquid comprises at least 50, 60, 70, 75, 80, 85, 90, 95, 96, 97, 97.5, 98, 99, 99.1, 99.5, or 99.9 wt. % $H_2O$, based upon a total weight of the liquid.

In a further exemplary embodiment, the reactor is at least one reactor selected from the group consisting of a stirred tank reactor, a packed bed reactor, a slurry reactor, and a bubble column reactor. In some embodiments, the reactor is a stirred tank reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the liquid occupies at least 1/20, 1/10, 3/10, 1/2, 2/3, 4/5, or 9/10 of the reactor volume. In some embodiments, the liquid occupies no more than 10/11, 9/10, 4/5, 2/3, 1/2, 3/10, or 1/10 of the reactor volume. In some embodiments, means of stirring or agitation may include magnetic stirring via magnetic spin bar, impellers, and/or ultrasonic waves. In certain embodiments, stirring or agitation may speed up the removal of $H_2S$.

In some embodiments, the reactor may be a vertical cylindrical reactor. The reactor has a plurality of inlets and outlets for fluids at the bottom of the reactor. In some further embodiments, the reactor has a plurality of inlets and outlets for fluids at the top of the reactor. In a preferred embodiment the reactor has a plurality of inlets and outlets for liquid-suspended solids at the bottom of the reactor. In some further preferred embodiments, the reactor has a plurality of inlets for solids at the top of the reactor.

In order to ensure that the solid and suspended materials in the composite mixture remain in suspension it is preferred that a series of recirculation tubes fluidly connect a lower portion of the vertical cylindrical reactor (preferably a bottom portion) with an upper portion or body portion of the vertical cylindrical reactor that contains the composite mixture and/or liquid materials present in the reactor. The recirculation tubes may fluidly connect to a conical bottom portion of the vertical cylindrical reactor representing the bottommost portion thereof. A plurality of recirculation routes is preferable. One or more pumping mechanisms functions to draw the composite mixture from the bottom portion of the vertical cylindrical reactor and reintroduce the composite mixture in suspended form at an upper portion of the body portion of the vertical cylindrical reactor, preferably at a point that is below the uppermost liquid line present inside the vertical cylindrical reactor. During operation one or more recirculation pumps having an upstream connection to an outlet at the bottom of the vertical cylindrical reactor and a downstream connection to the body portion of the vertical cylindrical reactor functions to keep the suspended materials in a suspended state thereby eliminating formation of a hardened plug of solid material at the bottom of the vertical cylindrical reactor. Preferably there are at least four recirculation tubes, one for each of four quadrants defining the cross-section of the vertical cylindrical reactor. The inlet points in the body portion of the vertical cylindrical reactor at which the composite mixture is returned to the vertical cylindrical reactor are preferably at a height of less than one half the total height of the body portion of the vertical cylindrical reactor preferably at a height of 0.3-0.45 of the total height of the body portion of the vertical cylindrical reactor, e.g., measured from the bottommost portion of the cylindrical shape to the topmost portion of the cylindrical shape not including and cone or extender. During operation both mechanical agitation by a propeller and mechanical agitation by the recirculation tubes may occur such that the solids materials inside composite mixture remain fully suspended without settling.

In some embodiments, the particles of the composite in the liquid may react with the $H_2S$ in the $H_2S$-containing gas composition optionally in the presence of a support to form a metal sulfide and a purified gas composition. In one embodiment, the $H_2S$-containing gas composition is sour gas. In another embodiment, the reactor may include a closed top. In a further embodiment, the sour gas is introduced to the reactor through a gas distributor located at a lower portion of a body portion of the reactor. In some embodiments, the particles of the composite are suspended in the liquid. In some further embodiments, the composite particles are retained in the liquid phase by a particle trap located at an upper portion of the body portion of the reactor. In another embodiment, the purified gas composition may be accumulated in an upper region of a reactor. In yet another embodiment, the accumulated purified gas composition may be vented from the reactor through the outlets at the top of the reactor to the gas analyzer. In a preferred embodiment, the metal sulfide may be accumulated and settled in the liquid to the lower portion of the body portion of the reactor.

In a further preferred embodiment, the metal sulfide accumulated may be removed from the liquid through the outlets at the bottom of the reactor.

In some embodiments, the H$_2$S-containing gas composition may be passed into the composite mixture by a gas distributor within the body of the composite mixture to distribute the gas composition in the form of small bubbles adjacent to a lower end of the reactor. The procedure may be operated as a continuous process or in intermittent manner and is particularly useful for scavenging operations. In some further embodiments, the H$_2$S-containing gas composition may be heated to a suitable temperature before passing the composite mixture. The heated H$_2$S-containing gas composition is then in direct contact with the composite to convert substantially all H$_2$S in the gas composition to metal sulfides.

In some embodiments, exhaustion of the capacity of the composite in the composite mixture to absorb and convert hydrogen sulfide to metal sulfides may be detected in any convenient manner and to form an exhausted reaction mixture containing metal sulfides. In some further preferred embodiments, the exhausted reaction mixture then is replenished with the composite mixture, or by the addition of the composite. Metal sulfides may be removed from the exhausted reaction mixture through the outlets at the bottom of the reactor.

At step 104, the method 100 includes dispersing particles of a composite in the liquid to form a composite mixture. In some embodiments, the composite includes a mixed metal oxide made from a layered hydroxide and a zeolitic imidazolate framework.

Layered hydroxides are a class of ionic solids characterized by a layered structure with the generic layer sequence [AcBZAcB]$_n$, where c represents layers of metal cations, A and B are layers of hydroxide (HO$^-$) anions, and Z are layers of other anions and neutral molecules (such as water). Lateral offsets between the layers may result in longer repeating periods. Layered hydroxides can be seen as derived from hydroxides of divalent cations with the brucite layer structure [AdBAdB]$_n$, by oxidation or cation replacement in the metal layers (d), so as to give them an excess positive electric charge; and intercalation of extra anion layers (Z) between the hydroxide layers (A,B) to neutralize that charge, resulting in the structure [AcBZAcB]$_n$. Layered hydroxides may be formed with a wide variety of anions in the intercalated layers (Z), such as dodecyl sulfate (DDS) (CH$_3$(CH$_2$)$_{11}$OSO$_3^-$), Cl$^-$, Br$^-$, nitrate (NO$_3^-$), carbonate (CO$_3^{2-}$), SO$_4^{2-}$, acetate (C$_2$H$_3$O$_{2-}$), SeO$_4^{2-}$, and combinations thereof. The size and properties of the intercalated anions may have an effect on the spacing of the layers, known as the basal spacing.

A layered hydroxide may be a synthetic or a naturally occurring layered hydroxide. Naturally-occurring layered hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered hydroxide, such as coalingite, brugnatellite, or muskoxite.

In preferred embodiments, the layered hydroxide has a positive layer (c) which contains both divalent and trivalent cations. In an embodiment, the divalent ion is at least one selected from the group consisting of M$^{2+}$ is Ca$^{2+}$, Mg$^{2+}$, Mn$^{2+}$, Fe$^{2+}$, Cu$^{2+}$, Ni$^{2+}$, Cu$^{2+}$, and Zn$^{2+}$. In an embodiment, the trivalent ion is at least one selected from the group consisting of N$^{3+}$ is Al$^{3+}$, Mn$^{3+}$, Cr$^{3+}$, Fe$^{3+}$, Sc$^{3+}$, Ga$^{3+}$, La$^{3+}$, V$^{3+}$, Sb$^{3+}$, Y$^{3+}$, In$^{3+}$, Co$^{3+}$ and/or Ni$^{3+}$. In a preferred embodiment, the layered hydroxide is a layered triple hydroxide (LTH) which contains two divalent cations and one trivalent cation. In a most preferred embodiment, the LTH is a CuMnAl LTH.

In an embodiment, the CuMnAl LTH has a molar ratio of Cu to Mn to Al of 1-10 to 1-10 to 1-10, preferably a ratio of Cu is 1, 2, 3, 4, 5, 6, 7, 8, 9 or 10, a ratio of Mn is 1, 2, 3, 4, 5, 6, 7, 8, 9 or 10, and a ratio of Al is 1, 2, 3, 4, 5, 6, 7, 8, 9 or 10. In some embodiments, the CuMnAl LTH has a molar ratio of Cu to Mn to Al of 1 to 2 to 1.

In an embodiment, the layered hydroxide component may have a particulate form, for example in the form of spheres, granules, whiskers, sheets, flakes, plates, foils, fibers, and the like. In some embodiments, the layered hydroxide includes particles having an average size of 10-70 nm, or preferably 15-65 nm, preferably 20-60 nm, preferably 25-55 nm, preferably 30-50 nm, preferably 35-45 nm. In some embodiments, the layered hydroxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered hydroxide particles are in the form of hexagonal nanoplatelets with particle sizes stated above. Such nanoplatelets may have a thickness of less than 10 nm, preferably less than 8 nm, preferably less than 6 nm, preferably less than 4 nm. In an embodiment, the layered hydroxide has a basal spacing of 0.5 to 10 nm, preferably 1 to 9 nm, 2 to 8 nm, 3 to 7 nm, 4 to 6 nm or 4.5 to 5.5 nm.

In some embodiments, the layered hydroxide can be calcined to remove the water present between the layers. The removal of the water creates voids between the layers which allows for further integration with the ZIF particles and improved performance as will be described later. In some embodiments, the calcination is at a temperature of 300-500° C., 350-450° C., or about 400° C. for 2-8 hours, preferably 3-7 hours, 4-6 hours, or about 5 hours. In a preferred embodiment, the CuMnAl LTH is calcined to form a CuMnAl mixed metal oxide (MMO). In the MMO the layers of the material from the layered hydroxide remain but have a more porous structure as the water is not present in the interlayer space. In addition, the layers in the MMO may no longer be directly stacked on top of one another as in the layered hydroxide, but rather form a more disorganized state where the layers are displaced and form additional pores. In a preferred embodiment, the ratios of the metal in the MMO remain the same as that of the layered hydroxide.

In an embodiment, the MMO component may have a particulate form, for example in the form of spheres, granules, whiskers, sheets, flakes, plates, foils, fibers, and the like. In some embodiments, the layered oxide includes particles having an average size of 10-70 nm, or preferably 15-65 nm, preferably 20-60 nm, preferably 25-55 nm, preferably 30-50 nm, preferably 35-45 nm. In some embodiments, the MMO particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the MMO particles are in the form of hexagonal nanoplatelets with particle sizes stated above. Such nanoplatelets may have a thickness of less than 10 nm, preferably less than 8 nm, preferably less than 6 nm, preferably less than 4 nm. As previously described, the particles remain the same as in the layered hydroxide but are no longer stacked directly on top of one another. The particles are randomly dispersed and the space between the particles are voids or pores. In some embodiments, the pores have an average diameter of 10-100 nm, preferably 20-90 nm, 30-80 nm, 40-70 nm, or 50-60 nm.

A metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally, a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e., N—, and/or O—) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Zn(II)) to produce a coordination network. In one or more embodiments, the ligand comprises an imidazole of formula (I) or a benzimidazole of formula (II):

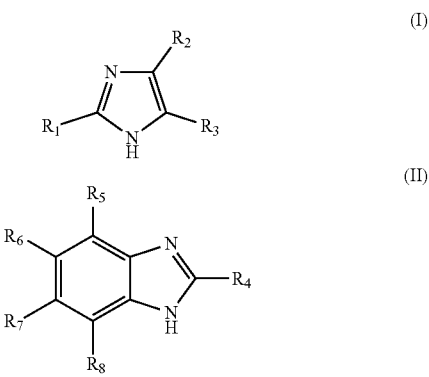

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. Preferably, $R_1$, $R_2$, $R_3$, $R_4$, $R_5$, $R_6$, $R_7$, and $R_8$ are each independently a hydrogen, an optionally substituted $C_1$-$C_3$ alkyl group, or an optionally substituted $C_3$-$C_6$ cycloalkyl group. More preferably, $R_1$, $R_2$, $R_3$, $R_4$, $R_5$, $R_6$, $R_7$, and $R_8$ are each independently a hydrogen or a methyl.

Exemplary imidazole-based ligands that may be applicable to the current disclosure include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl)methanol, 4-(hydroxymethyl)imidazole, 2-aminoimidazole, 4-(trifluoromethyl)-1H-imidazole, 4-cyanoimidazole, 3H-imidazole-4-carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, and 2-butyl-5-hydroxymethylimidazole. In preferred embodiments, the imidazole of formula (I) is 2-methylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2- acetate, 1H-benzoimidazol-4-ol, 1H-benzimidazol-5-ylmethanol, 2-benzimidazolemethanol, 4-chloro-6-(trifluoromethyl)benzimidazole, 5-chloro-2-(trichloromethyl) benzimidazole, 5-cyanobenzimidazole, (2-benzimidazolyl) acetonitrile, (5-chloro-1H-benzimidazol-2-yl)methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl)ethanol, 2-(1H-benzoimidazol-2-yl)-acetamide, (6-methoxy-1H-benzimidazol-2-yl)methanol, 5,6-dimethoxybenzimidazole, 2-(1H-benzoimidazol-2-yl)-ethylamine, 1-(5-methyl-1H-benzimidazol-2-yl)methanamine, 1-(5-methyl-1H-benzimidazol-2-yl)ethanamine, 2-benzimidazolepropionic acid, 2-(5-methyl-1H-benzimidazol-2-yl)ethanamine, 2-(3-hydroxy-N-propyl)-5-(trifluoromethyl)-benzimidazole, and N-methyl-1-(5-methyl-1H-benzimidazol-2-yl)methanamine.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

In a most preferred embodiment, the ZIF is ZIF-67 in which the imidazole ligand is 2-methylimidazole and the metal ion is Co. In an embodiment, the ZIF may have a particulate form, for example in the form of spheres, granules, whiskers, sheets, flakes, plates, foils, fibers, and the like. In some embodiments, the ZIF includes particles having an average size of 1-100 nm, or preferably 10-90 nm, preferably 20-80 nm, preferably 30-70 nm, preferably 40-60 nm, preferably 45-55 nm. In a preferred embodiment, the ZIF particles are spherical nanoparticles.

In an embodiment, the composite is made by a method including preparing the MMO and then mixing the MMO with precursors of the ZIF to form the composite. The precursors of the ZIF include the imidazole or benzimidazole ligands and the metal ion. In a preferred embodiment, after the components are sufficiently mixed, i.e., to form a fully dispersed solution of the components, the fully dispersed solution is aged by remaining undisturbed for at least 1 hour, preferably 1-10 hours, 2-9 hours, 3-8 hours, 4-7 hours, or 5-6 hours. The aging process allows for the particles of the ZIF to crystallize within the layers of the MMO. In some embodiments, the ZIF nanoparticles are dispersed between layers of the MMO. In some embodiments, the ZIF nanoparticles are further dispersed on top of layers of the MMO. In some embodiments, the ZIF and the MMO remain separate crystalline entities in the composite and do not interact through covalent bonds.

In some embodiments, the composite contains 30-70 wt. % of the MMO, preferably 35-65 wt. %, 40-60 wt. %, or 45-55 wt. % of the MMO and 30-70 wt. % of the ZIF, preferably 35-65 wt. %, 40-60 wt. %, 45-55 wt. % of the ZIF based on a total weight of the composite. In some embodiments, the composite contains 30-70 wt. % of the CuMnAl MMO, preferably 35-65 wt. %, 40-60 wt. %, or 45-55 wt. % of the CuMnAl MMO and 30-70 wt. % of the ZIF-67, preferably 35-65 wt. %, 40-60 wt. %, 45-55 wt. % of the ZIF-67 based on a total weight of the composite.

In some embodiments, the composite has a Langmuir specific surface area of 100-150 $m^2/g$, preferably 110-140 $m^2/g$, or 120-130 $m^2/g$. In some embodiments, the composite has a BET specific surface area of 90-130 $m^2/g$, preferably 100-120 $m^2/g$, or 105-115 $m^2/g$. In some embodiments, the composite has a specific pore volume of 0.05-0.2 $m^3/g$, preferably 0.10-0.15 $m^3/g$, or about 0.13 $m^3/g$. In some embodiments, the composite has a pore size of 20-25 nm, preferably 21-24 nm, or 22-23 nm. In some embodiments, the composite has a zeta potential of 10-30 mV, preferably 15 to 25 mV, or about 20 mV at a pH of 4 to 9.

In some embodiments, the composite is supported on at least one support selected from the group consisting of a graphene-based material, an alumina, a carbon nanotube, an activated carbon, a metal organic framework (MOF), and a zeolitic imidazolate framework (ZIF).

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise, they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanomaterial is activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanomaterial is carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

As used herein, the term "zeolitic," "zeolite," "zeolitic materials," and similar terms generally refer to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

In some embodiments, the support is aluminum oxide. In some embodiments, the aluminum oxide is gamma (γ) aluminum oxide. In some embodiments, the aluminum oxide may include, but are not limited to, alpha (α) aluminum oxide and beta (β) aluminum oxide.

In some embodiments, the porous support is present in the form of particles. In general, the porous support particles can be any shape known to one of ordinary skill in the art. Examples of suitable shapes the metal organic framework particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, nanotubes, blocks, flakes, discs, granules, angular chunks, and mixtures thereof.

In some embodiments, the porous support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of porous support particles having a different shape. As used herein, the term "non-uniform shape" refers to an average consistent shape that differs by more than 10% of the distribution of porous support particles having a different shape. In one embodiment, the shape is uniform and at least 90% of the porous support particles are spherical or substantially circular, and less than 10% are polygonal. In another embodiment, the shape is non-uniform and less than 90% of the porous support particles are spherical or substantially circular, and greater than 10% are polygonal.

In some embodiment, the porous support is in the form of particles having a mean particle size of 100 to 10,000 nm, preferably 125 to 9,500 nm, preferably 150 to 9,000 nm, preferably 175 to 8,500 nm preferably 200 to 8,000 nm, preferably 250 to 7,500 nm. In embodiments where the porous support particles are spherical, the particle size may refer to a particle diameter. In embodiments where the porous support particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the porous support particles have an anisotropic shape such as nanorods or nanotubes, the particle size may refer to a length of the nanorod or nanotube, a width of the nanorod or nanotube, or an average of the length and width of the nanorod or nanotube. In some embodiments, the particle size refers to the diameter of a sphere having an equivalent volume as the particle.

At step 106, the method 100 includes continuously agitating the composite mixture in the reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the composite mixture occupies at least 1/20, 1/10, 3/10, 1/2, 2/3, 4/5, or 9/10 of the reactor volume. In still yet some other embodiments, the composite mixture occupies no more than 10/11, 9/10, 4/5, 2/3, 1/2, 3/10, or 1/10 of the reactor volume.

At step 108, the method 100 includes introducing the $H_2S$-containing gas composition to the reactor containing the composite mixture under continuous agitation and passing the $H_2S$-containing gas composition through the composite mixture.

In some embodiments, the $H_2S$-containing gas composition is natural gas.

In some embodiments, the $H_2S$-containing gas composition further comprises at least one hydrocarbon selected from the group consisting of methane, ethane, ethylene, propylene, propane, butane, butene, butadiene, and/or isobutylene. The hydrocarbon may further or alternatively include dimethyl ether, ethyl methyl ether, neopentane. The hydrocarbon may comprise at least 20, 40, 60, 80, 90, 95, 99.5, or 99.9 wt. % methane, ethane, ethylene, propylene, propane, butane, butene, butadiene, and/or isobutylene, based on a total weight of hydrocarbons. Other ranges are also possible.

In some embodiments, the $H_2S$-containing gas composition may further comprise $CO_2$, and the $CO_2$ may be present in 2, 5, 10, 15, 20, 25, 30, 40, 50, 60, 65, 75, 85, 100, 150, 200, 250-fold the amount, or more, of the $H_2S$ based on moles. The gas composition may further contain $N_2$, CO, Ar, $H_2$, He, $NH_3$, $O_2$, and/or $O_3$, but may exclude any or all of these. Although, other gasses may be present in the gas composition, the composite selectively adsorbs the $H_2S$ and does not adsorb any of the other gases.

In some embodiments, the $H_2S$ is present in the gas composition at a concentration in a range of 10 to 200 parts per million by volume (ppmv), preferably 20 to 180 ppmv, preferably 40 to 160 ppmv, further preferably 60 to 140 ppmv, more preferably 80 to 12 ppmv, or even more preferably 100 ppmv, based on a total volume of the gas composition. Other ranges are also possible.

In some embodiments, the composite is present in the liquid at a concentration in a range of from 0.5 to 2 milligrams per milliliter (mg/mL), preferably 0.75-1.75 mg/mL, 1.00-1.50 mg/mL, or about 1.25 mg/mL.

In some embodiments, the $H_2S$-containing gas composition is introduced to the reactor at a rate of from 0.4 to 2.0 milliliters per minute (mL/min) per milligram of the composite, preferably 0.5 to 1.8, preferably 0.6 to 1.6, preferably 0.7 to 1.4, preferably 0.8 to 1.2, preferably 0.9 to 1.1, or 1.0 mL/min per milligram of the composite. Other ranges are also possible.

In some embodiments, the composite mixture is in contact with the $H_2S$-containing gas composition at a temperature in a range of from 15 to 40° C., preferably 20 to 35° C., preferably 25 to 30° C. under a pressure of 0.9 to 1.2 bar, preferable 0.95 to 1.15 bar, preferably 1.0 to 1.1 bar. Other ranges are also possible.

At step 108, the inventive method 100 may be carried out at pHs in the neutral range and/or above 4, though the efficiency of the $H_2S$ removal should be within 90% across the pH range of 2 to 13, 3 to 11, 4 to 10, 5 to 8, or 6 to 7.5. No particular considerations need to be taken regarding pH, and acceptable reaction pHs will generally be at the ambient/natural conditions of water available.

At step 110, the method 100 includes adsorbing the $H_2S$ from the $H_2S$-containing gas composition onto the composite to remove the $H_2S$ from the $H_2S$-containing gas composition and form a purified gas composition.

As used herein, the term "breakthrough time" refers to the elapsed time between initial contact of the composite mixture with the H$_2$S-containing gas composition and the time at which H$_2$S is detected in the purified gas composition. In accordance with the present disclosure, the detection limit for H$_2$S in a gas composition is 0.5 ppm, based on a total weight of the gas composition.

As used herein, the term "saturation time" refers to the time during which the adsorbent is saturated (in equilibrium) with the adsorbate.

As used herein, the term "scavenging capacity," "adsorption capacity", and similar terms generally refer to the amount of adsorbate taken up by the adsorbent per unit mass or per unit volume of the adsorbent. In accordance with the present disclosure, the term refers to the amount of H$_2$S taken up by the composite per gram of the compound.

In some embodiments, the H$_2$S content in the purified gas composition after adsorbing by the composite is no more than 100 ppmv, 80 ppmv, 60 ppmv, 40 ppmv, 20 ppmv, or 10 ppmv, based on a total volume of the purified gas composition for 1 to 10 minutes, preferable 2 to 5 minutes, preferably about 3 minutes of contact with the composite at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. Other ranges are also possible.

In some embodiments, the composite is present in the aqueous media at a concentration of 1 mg/mL, the composite is in contact with the gas composition containing 100 ppmv of H$_2$S at a rate of 80 mL/min in the stirred tank reactor, and the composite has a breakthrough time of from 11-15 hours, preferably 12-14 hours, or about 13 hours and a saturation time of from 35-40 hours, preferably 36-39 hours, or about 37-38 hours. In some embodiments, the composite has a saturation scavenging capacity 100-130 mg of hydrogen sulfide per gram of composite in the reactor, preferably 105-125 mg/g, 110-120 mg/g, or about 115 mg/g.

According to a second aspect, the present disclosure relates to a method of making the composite, and its application in a continuous stirred tank process for the desulfurization of sour gases and liquid hydrocarbon fuels. In some embodiments, the composite includes ZIF-67 and a CuMnAl LTH. The method of making the composite includes the following steps. The order in which the steps are described is not intended to be construed as a limitation, and any number of the described method steps may be combined in any order to implement the method. Additionally, individual steps may be removed or skipped from the method without departing from the spirit and scope of the present disclosure.

The method includes mixing and dissolving a first metal salt, a second metal salt, and a third metal salt in a liquid to form a first mixture. In some embodiments, the liquid is selected from the group consisting of tap water, ground water, distilled water, deionized water, hard water, and fresh water. In some preferred embodiments, the liquid may be deionized water, and/or distilled water.

In some embodiments, the first metal salt, the second metal salt, and the third metal salt are a copper salt, an aluminum salt, and a manganese salt, respectively, although other metals may be used depending on the target formula of the LTH. In some embodiments, a molar ratio of the copper salt to the manganese salt to the aluminum salt is 1:2:1.

In some embodiments, the metal salts are a sulfate, an acetate, a citrate, an iodate, a chloride, a perchlorate, a nitrate, a phosphate, or a bromide, of the respective metal, including hydrates thereof. In a preferred embodiment, the salts are nitrates, Cu(NO$_3$)$_2$·3H$_2$O, Mn(NO$_3$)$_2$·6H$_2$O, and Al(NO$_3$)$_3$·9H$_2$O. The salt of the metal is the intercalating ion in the LTH.

The method includes dissolving at least one base in a liquid to form a second mixture. The base is selected from the group consisting of potassium hydroxide, sodium hydroxide, barium hydroxide, cesium hydroxide, strontium hydroxide, calcium hydroxide, lithium hydroxide, sodium carbonate, potassium carbonate, and sodium bicarbonate. The base is preferably NaOH and Na$_2$CO$_3$. In some embodiments, NaOH and Na$_2$CO$_3$ may be replaced by another alkali metal base which has at least one metal ion selected from the group consisting of Li, K, Ca, or a combination thereof. In some embodiments, NaOH is present in the second mixture at a concentration of 150 to 550 millimolars (mM), preferably 250 to 500 mM, preferably 300 to 450 mM, preferably 310 to 350 mM, or more preferably 335 mM. In some embodiments, Na$_2$CO$_3$ is present in the second mixture at a concentration of 5 to 50 mM, preferably 10 to 45 mM, preferably 15 to 40 mM, preferably 20 to 35 mM, or more preferably 28 mM. Other ranges are also possible. In some embodiments, the liquid is selected from the group consisting of tap water, ground water, distilled water, deionized water, hard water, and fresh water. In some preferred embodiments, the liquid may be deionized water, and/or distilled water.

The method includes mixing the first and the second mixture, preferably dropwise to form a third mixture. In some embodiments, the pH value of the third mixture is adjusted to be about 9, preferably about 9.5, preferably about 10, preferably about 10.5, preferably about 11, or preferably about 11.5. Other ranges are also possible. In some embodiments, the addition rate of the first mixture and the second mixture ranges from 1 to 1000 drops per minute (drop/min), preferably from 10 to 800 drop/min, preferably from 30 to 500 drop/min, preferably from 60 to 300 drop/min, preferably from 80 to 200 drop/min, or 100 drop/min. After completion of the addition, in some embodiments, the third mixture is further mixed at ambient temperature for at least 5 minutes, at least 15 minutes, at least 30 minutes, at least 60 minutes, or at least 120 minutes, and for no more than 150 minutes, no more than 120 minutes, no more than 90 minutes, no more than 60 minutes, no more than 30 minutes, or no more than 15 minutes. Other ranges are also possible.

The third mixture is heated in an autoclave to form the CuMnAl LTH. In some embodiments, the crude mixture is heated in an oven at a temperature in a range of 80 to 200° C., 85 to 160° C., preferably 90 to 150° C., further preferably 100 to 140° C., preferably 110 to 130° C., and more preferably 120° C. for 6 to 72 hours, 12 to 48 hours, 18 to 36 hours, or preferably 24 hours. Other ranges are also possible. Preferably the method includes washing and drying to form the LTH. In some embodiments, the crude LTH is washed with distilled water to remove all impurities for at least 1 time, at least 3 times, at least 5 times, at least 10 times, or at least 30 times before drying. In some further embodiments, drying is conducted in an oven at a temperature in a range of 50 to 130° C., preferably 60 to 110° C., preferably 70 to 90° C., or more preferably 90° C. for 6 to 72 hours, 12 to 48 hours, 18 to 36 hours, or preferably 24 hours to afford the LTH. Other ranges are also possible.

The method optionally includes calcining the CuMnAl LTH to form a CuMnAl MMO. In some embodiments, the calcination is at a temperature of 300-500° C., 350-450° C., or about 400° C. for 2-8 hours, preferably 3-7 hours, 4-6 hours, or about 5 hours.

The method further includes forming the composite by preparing the ZIF-67. The MMO is dispersed in an aqueous solution, preferably by sonication. In some embodiments, separate solutions of the precursors of the ZIF are prepared. The precursors of the ZIF include the imidazole or benzimidazole ligands and the metal ion, as previously described. To prepare ZIF-67 the imidazole ligand is 2-methylimidazole, prepared in a weak base, such as ammonia or pyridine. The metal ion is cobalt, preferably in a form of cobalt nitrate dissolved in water. The cobalt, the 2-methylimidazole, and the MMO are then added together and mixed preferably by sonication for about 1 hour. In a preferred embodiment, the MMO, the cobalt salt, and the 2-methylimidazole each have an equal amount by weight. In a preferred embodiment, after the components are sufficiently mixed, i.e., to form a fully dispersed solution of the components, the fully dispersed solution is aged by remaining undisturbed for at least 1 hour, preferably 1-10 hours, 2-9 hours, 3-8 hours, 4-7 hours, or 5-6 hours. The aging process allows for the particles of the ZIF to crystallize within the layers of the MMO. The composite is then separated, washed and dried, as would be known to one of ordinary skill in the art.

The examples below are intended to further illustrate protocols for preparing, characterizing, and using the composite and for performing the method described above and are not intended to limit the scope of the claims.

EXAMPLES

The following examples describe and demonstrate a process for removing hydrogen sulfide ($H_2S$) from a $H_2S$-containing gas composition described herein. The examples are provided solely for illustration and are not to be construed as limitations of the present disclosure, as many variations thereof are possible without departing from the spirit and scope of the present disclosure.

Example 1: CuMnAl Mixed Metal Oxide Preparation

The CuMnAl layered triple hydroxide (LTH) was synthesized using a hydrothermal method as follows. First, solution A was prepared by dissolving certain amounts of NaOH and $Na_2CO_3$ in a specific volume of distilled water to give 446.4 and 27.9 mM NaOH and $Na_2CO_3$, respectively. In parallel, solution B was prepared by dissolving certain amounts of $Cu(NO_3)_2 \cdot 3H_2O$, $Mn(NO_3)_2 \cdot 6H_2O$, and $Al(NO_3)_3 \cdot 9H_2O$ in a specific volume of distilled water to give 55.8, 111.6, and 55.8 mM $Cu^{2+}$, $Mn^{2+}$, and $Al^{3+}$, respectively. The total molar concentration of $Cu^{2+}$, $Mn^{2+}$, and $Al^{3+}$ was 223.2 mM. The molar ratio of $Cu^{2+}:Mn^{2+}:Al^{3+}$ was 1:2:1.

After the preparation of solutions A and B, the two solutions were simultaneously added dropwise to a beaker. The pH of the mixture in the beaker was kept at 11±1 via controlling the addition rate of solutions A and B. The mixture in the beaker was continuously stirred at room temperature under ambient air during the addition of solutions A and B. The mixture was further stirred for additional 30 minutes after the addition is complete. Then, the produced suspension was transferred into an autoclave reactor and placed in an oven at 120° C. for 24 h. The crude CuMnAl-LTH was then washed several times with distilled water in order to remove impurities. The solid paste was dried overnight at 80° C. to give the purified solid CuMnAl LTH.

The solid CuMnAl LTH sample was then calcined at 400° C. for an hour to yield the CuMnAl mixed metal oxide (MMO). The CuMnAl MMO sample was ground into fine particles and used to prepare ZIF-67/CuMnAl MMOs.

Example 2. Composite Preparation

A composite of the CuMnAl-MMO and a ZIF-67, labeled as ZIF-67/CuMnAl MMO or as the composite, was prepared as follows. First, CuMnAl MMO (0.12 g/mL) was added to distilled water, followed by 1 hour (h) sonication using a probe sonicator in order to disperse the CuMnA MMO in water. While sonicating the CuMnAl MMO solution, cobalt and 2-methylimidazole aqueous solutions were prepared. The preparation of the cobalt solution was via dissolving $Co(NO_3)_2 \cdot 6H_2O$ in distilled water (0.12 g/mL) while the 2-methylimidazole solution (0.16 g/mL) was prepared using 28% ammonia. After the preparation of the cobalt solution, it was added to the CuMnAl MMO dispersion, followed by additional 5-10 min of sonication. Then, the 2-methylimidazole solution was added to the Co/CuMnAl MMO mixture under a vigorous stirring at room temperature. Upon the completion of the 2-methylimidazole solution addition, the vigorous stirring of the resultant reaction mixture was continued for 1 h to ensure the completion of the reaction, followed by 3 h of aging to facilitate the crystallization of ZIF-67 nanoparticles onto/into the CuMnAl MMO layers. During the aging time, the reaction mixture was kept undisturbed at room temperature. The formed ZIF-67/CuMnAl MMO composite was then collected by centrifugation for 20 min at 10,000 rpm. To remove the unreacted precursors, the collected ZIF-67/CuMnAl MMO composite was washed several times with distilled water (20 min each cycle). Then, the purified ZIF-67/CuMnAl MMO composite was dried at 50° C.

Example 3: Composite Characterization Techniques

The crystalline structure of the composite was characterized by the Fourier transform infrared spectra (FTIR). FTIR spectra of the composites were studied by using a Fourier transform infrared spectra (Nicolet 170 IR spectrometer). For the Fourier transform infrared spectra characterization, the KBr discs of the samples were prepared by mixing and grinding the samples with KBr powder in mortar with pestle. The mixture is then shaped into discs under mechanical pressure. The samples discs were put into Fourier transform infrared spectra and spectral measurements were recorded in the wavenumber range of 450-4000 cm-1. Prior to the above measurement, the samples were vacuum-dried at 60° C. for a duration of 24 h.

BET analysis of nitrogen adsorption-desorption isotherm and pore-size distribution curves of the composite was measured on a Quantachrome Autosorb 1-C instrument with $N_2$ adsorption at 77 K. The composite was outgassed at 120° C. without exposure to air before nitrogen loading. The BET surface area was determined with a P/P0 range of 0.01 to 0.04. Analysis of isotherms was carried out by applying various methods to obtain different information. The BET equation was used to get the BET surface area from the $N_2$ isotherm. The T-method was used to find the micropore volume and the external surface area of the mesoporous fraction from the volume of $N_2$ adsorbed up to the P/P0-0.0315.

Example 4: Composite Characterization

Figure 2:
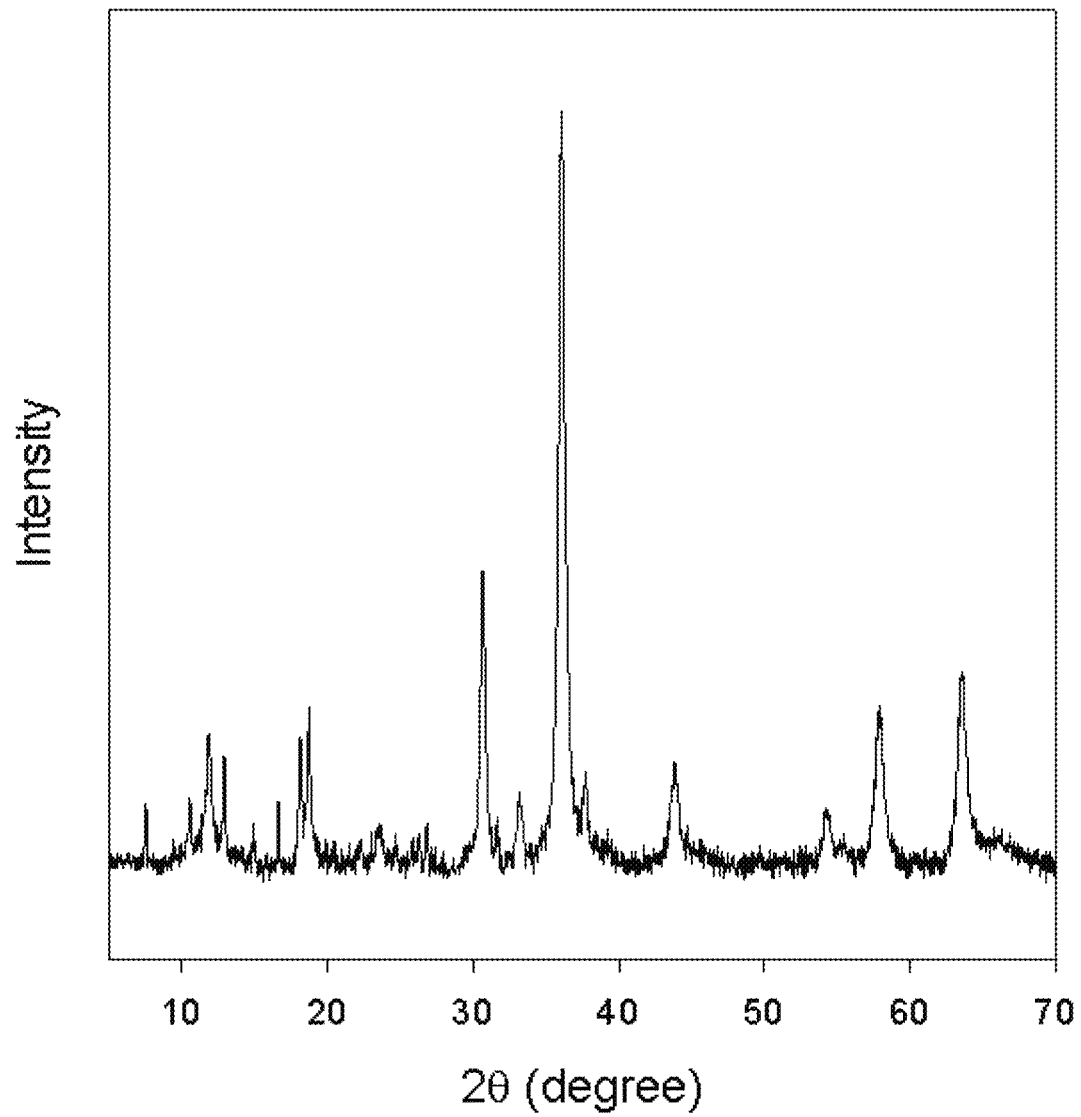
FIG. 2 illustrates an X-ray diffraction (XRD) pattern of a composite, according to certain embodiments.

FIG. 2 shows an XRD pattern of the composite. The XRD shows a crystalline material with a combination of both the ZIF-67 and the MMO.

Figure 3:
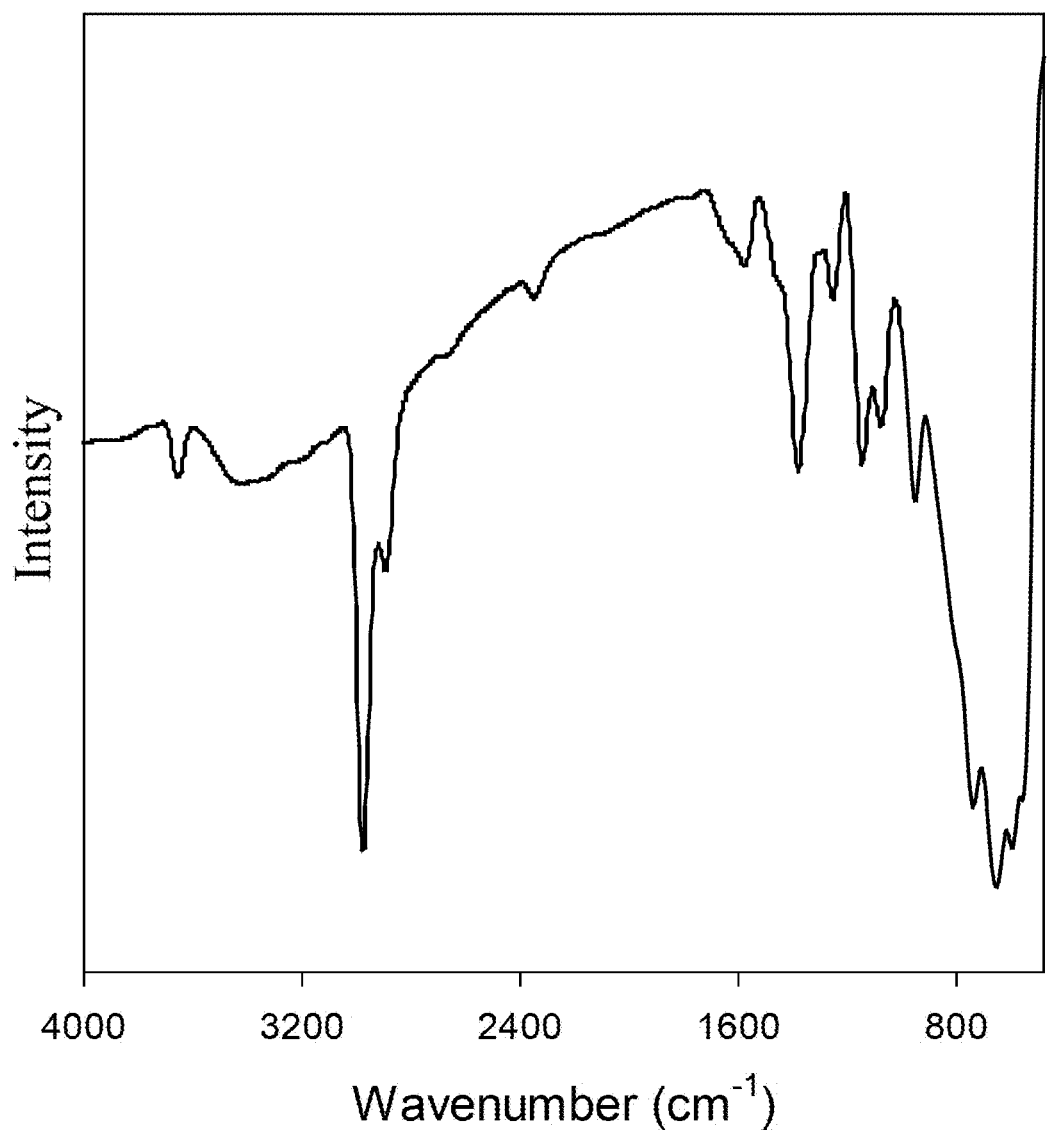
FIG. 3 illustrates a Fourier Transform Infrared (FT-IR) spectrum of the composite, according to certain embodiments.

FIG. 3 shows a FT-IR spectrum of the composite, confirming a combination of both the ZIF-67 and the MMO.

Figure 4:
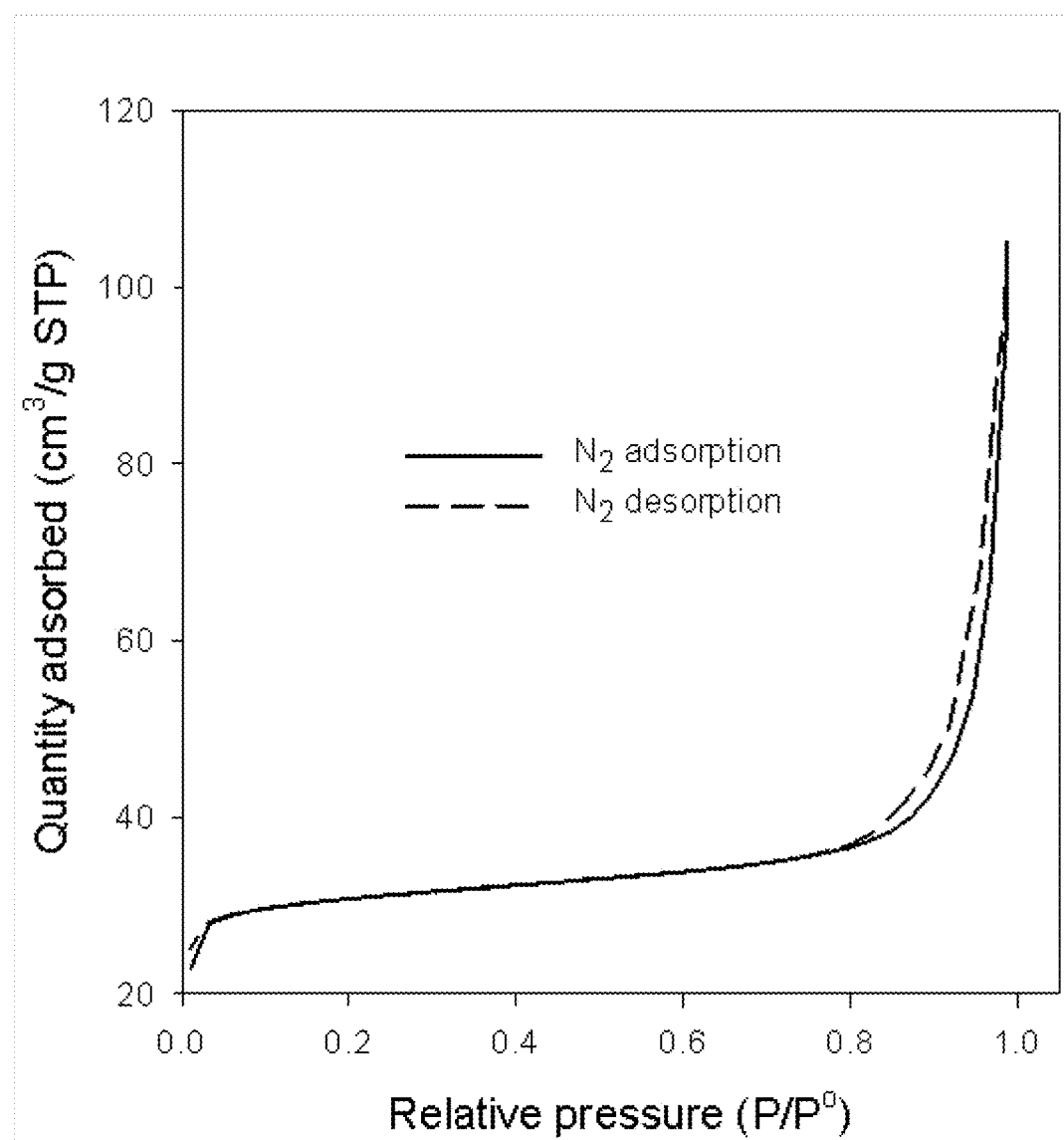
FIG. 4 illustrates isotherms of N₂ adsorption and desorption from the composite, according to certain embodiments.

FIG. 4 shows isotherms of $N_2$ adsorption and desorption from the composite. The obtained Langmuir specific surface area, Brunauer-Emmett-Teller (BET) specific surface area, specific pore volume, and pore size were calculated as 139.3 $m^2/g$, 112.3 $m^2/g$, 0.125 $m^3/g$, and 23.9 nm, respectively.

Figure 5:
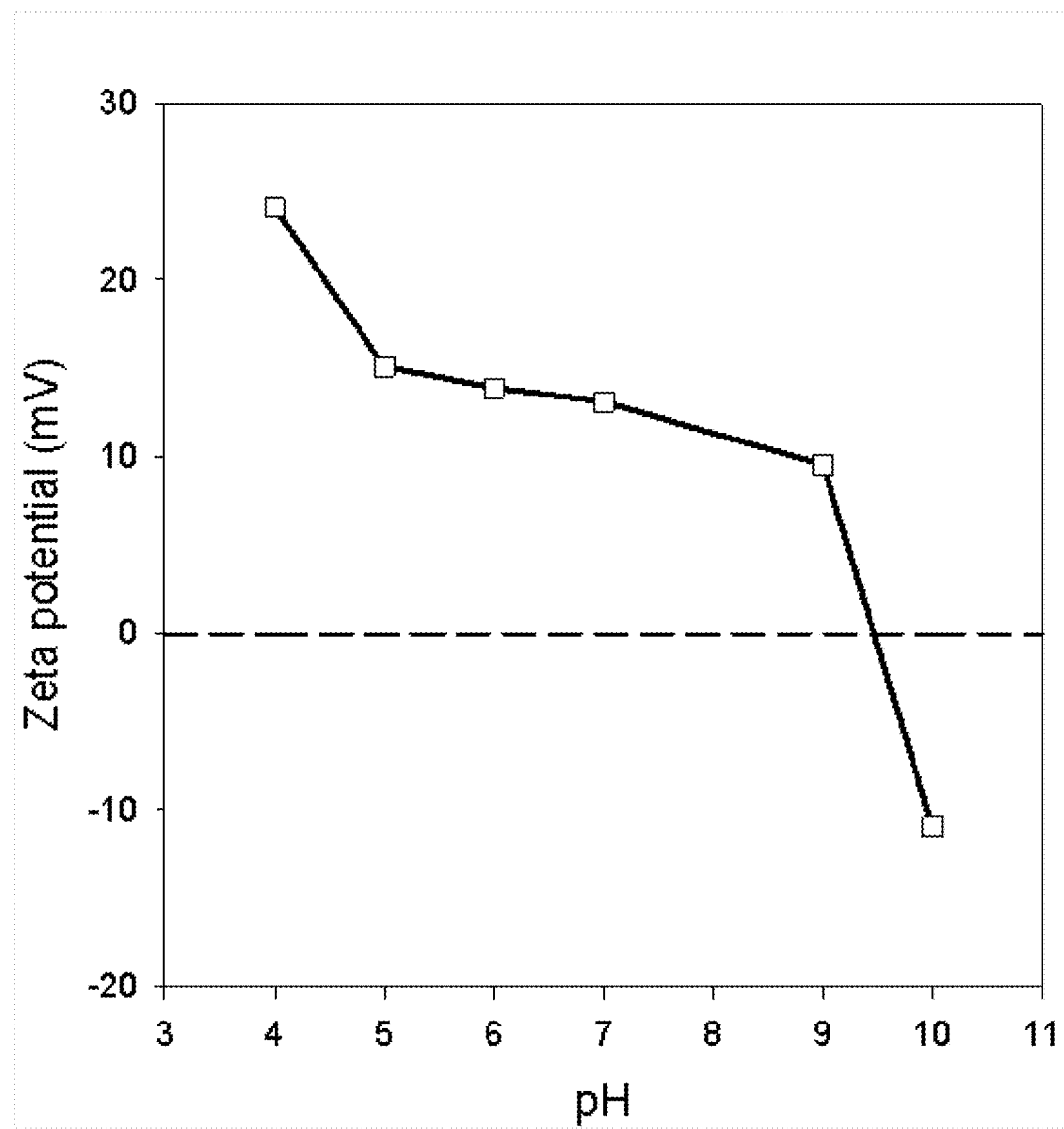
FIG. 5 illustrates a zeta potential plot of the composite versus the pH of an aqueous suspension, according to certain embodiments.

FIG. 5 is plot of zeta potential of the composite versus the pH of its aqueous suspension. The plot shows that the composite carries a net positive charge up to pH of 9.46. At this pH the net charge ($pH_{PZC}$) on the composite is zero. Therefore, the point of zero charge of the composite was pH=9.46. Beyond this pH value, the composite carries a net negative charge.

Example 5: Composite Performance

The composite (0.1 g) was dispersed in 100 mL water via magnetic stirring. A sour gas stream containing $H_2S$ (100.3 ppm) a mixture of $CO_2$ (5000 ppm) and nitrogen (balance) was introduced to the stirred tank reactor at a flow rate of 80 mL/min. The gas exiting the reactor was sent to an $H_2S$ gas detector with a detection limit of 0.5 ppm. The exit gas was monitored and the concentration of $H_2S$ in the treated gas was continuously recorded. The experiments were conducted at ambient conditions (room temperature and atmospheric pressure).

Figure 6:
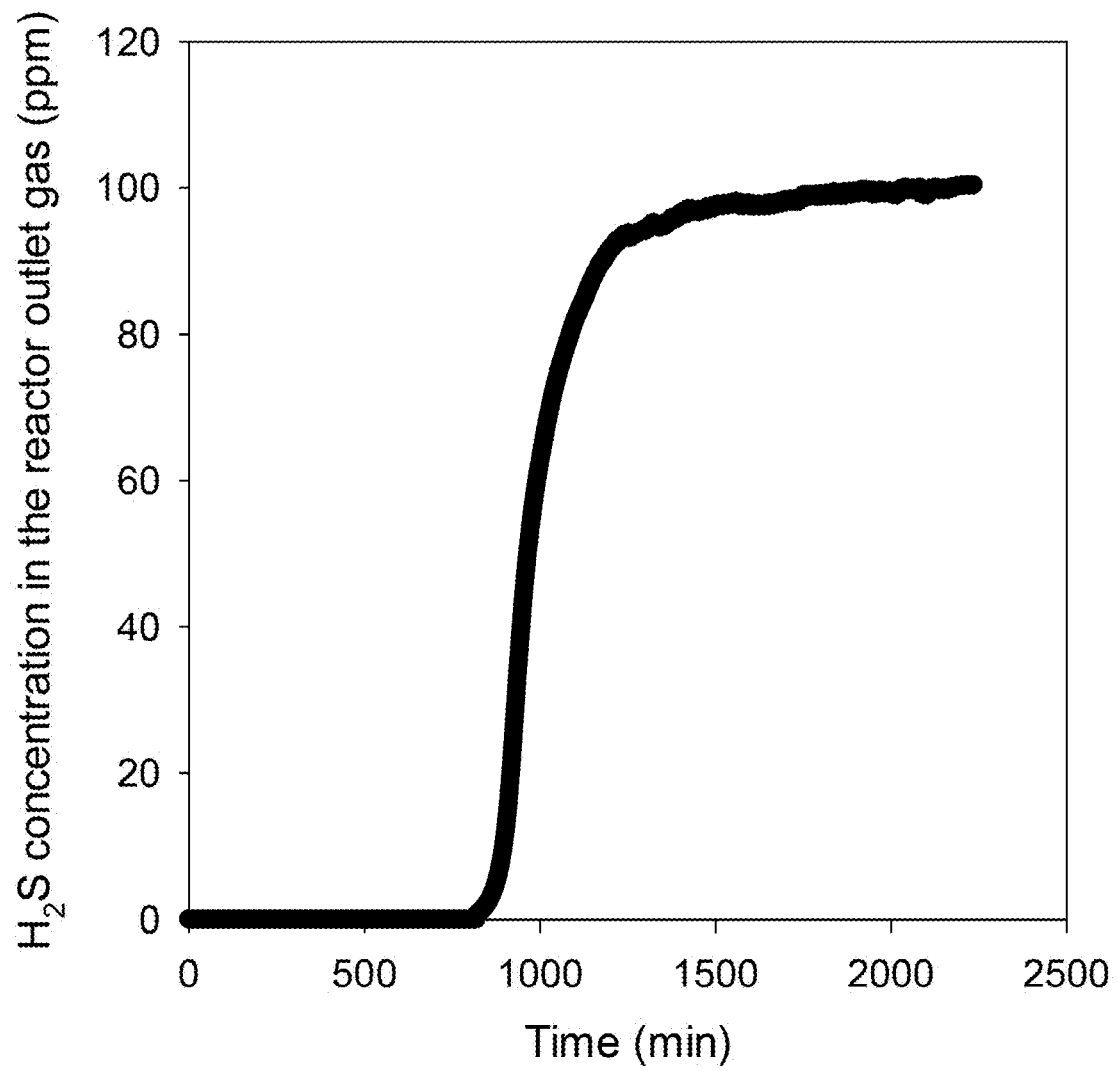
FIG. 6 illustrates a breakthrough curve of the composite, according to certain embodiments.

FIG. 6 shows the breakthrough curve obtained using the composite under the above conditions. The breakthrough time was 819 minutes while the saturation time was 2204 minutes. The $H_2S$ scavenging capacities at the breakthrough and the saturation times were 91.4 and 114.2 mg $H_2S$/g catalyst, respectively. The breakthrough time is defined as the time at which a portion of the $H_2S$ is no longer adsorbed and instead passed through and reaches the detector. The saturation time is defined as the time at which the composite is fully saturated and does not adsorb any further $H_2S$.

It is also noteworthy to mention that the composite loading can be adjusted depending on the $H_2S$ concentration in the $H_2S$-containing gas composition as well as the sour gases flow rate. The loading of the composite can be high such that it can form a thick reaction slurry (i.e., slurry phase reaction). Additionally, the stirring speed, medium pH, volume, reaction temperature, pressure, and gas inlet flow rate can be adjusted to meet the reactor configurations and design parameters.

Example 6: Application in Sour Oil Desulfurization

Sour oil can also be treated by the method described in the present disclosure. Firstly, the sour oil is emulsified in water to form an emulsion. Then, the composite is mixed and suspended in the emulsion. Additionally, the contact between the sulfur-bearing components of the sour oil in the emulsion and the composite promote the desulfurization of sour oil.

Numerous modifications and variations of the present disclosure are possible in light of the above teachings. It is therefore to be understood that within the scope of the appended claims, the invention may be practiced otherwise than as specifically described herein.

The invention claimed is:

1. A method for removing hydrogen sulfide ($H_2S$) from a $H_2S$-containing gas composition, comprising:
    charging an aqueous media to a reactor under continuous agitation;
    dispersing particles of a composite in the aqueous media to form a composite mixture;
    continuously agitating the composite mixture;
    introducing the $H_2S$-containing gas composition to the reactor containing the composite mixture under continuous agitation and passing the $H_2S$-containing gas composition through the composite mixture; and
    adsorbing and removing $H_2S$ from the gas composition by the composite mixture to form a purified gas composition,
    wherein the composite comprises:
        a CuMnAl mixed metal oxide (MMO); and
        zeolitic imidazolate framework-67 (ZIF-67) nanoparticles,
    wherein the ZIF-67 nanoparticles are dispersed between layers of the CuMnAl MMO, and
    wherein the composite is made by a method comprising:
        preparing a CuMnAl layered triple hydroxide (LTH);
        calcining the CuMnAl LTH to form a CuMnAl MMO; and
        mixing the CuMnAl MMO with precursors of the ZIF-67 to form the composite.

2. The method of claim 1, wherein the CuMnAl MMO has a molar ratio of Cu to Mn to Al of 1-10 to 1-10 to 1-10.

3. The method of claim 1, wherein the CuMnAl MMO has a molar ratio of Cu to Mn to Al of 1 to 2 to 1.

4. The method of claim 1, wherein the composite comprises 30-70 wt. % of the CuMnAl MMO and 30-70 wt. % of the ZIF-67 nanoparticles, based on a total weight of the composite.

5. The method of claim 1, wherein the ZIF-67 nanoparticles have an average size of 1-100 nm.

6. The method of claim 1, wherein the ZIF-67 nanoparticles have a spherical shape.

7. The method of claim 1, wherein the ZIF-67 nanoparticles are further dispersed on top of layers of the CuMnAl MMO.

8. The method of claim 1, wherein the composite has a Langmuir specific surface area of 100-150 $m^2/g$.

9. The method of claim 1, wherein the composite has a BET specific surface area of 90-130 $m^2/g$.

10. The method of claim 1, wherein the composite has a specific pore volume of 0.05-0.2 $m^3/g$.

11. The method of claim 1, wherein the composite has a pore size of 20-25 nm.

12. The method of claim 1, wherein the composite has a zeta potential of 10-30 mV at a pH of 4 to 9.

13. The method of claim 1, wherein the gas composition further comprises at least one of methane, carbon dioxide, and nitrogen, and
    wherein the composite selectively adsorbs the $H_2S$.

14. The method of claim 1, wherein the $H_2S$ is present in the gas composition at a concentration in a range of 10 to 200 parts per million by volume (ppmv) based on a total volume of the gas composition.

15. The method of claim 1, wherein the $H_2S$-containing gas composition is introduced to the reactor at a rate of 0.4 to 2.0 milliliters per minute (mL/min) per milligram of the composite.

16. The method of claim 1, wherein the composite is present in the aqueous media at a concentration in a range of from 0.5 to 2 milligrams per milliliter (mg/mL).

17. The method of claim 1, wherein the composite is present in the aqueous media at a concentration of 1 mg/mL,
    wherein the composite is in contact with the gas composition comprising 100 ppmv of $H_2S$ at a rate of 80 mL/min in the stirred tank reactor, wherein the composite has a breakthrough time of from 11-15 hours, and a saturation time of from 35-40 hours.

18. The method of claim 17, wherein the composite has a saturation scavenging capacity 100-130 mg of hydrogen sulfide per gram of composite in the reactor.

19. The method of claim 1, wherein the composite is supported on a support selected from the group consisting of carbon nanotubes, activated carbon, metal organic frameworks (MOFs), and other zeolitic imidazolate frameworks (ZIFs).

* * * * *